United States Patent [19]
Edwards

[11] 3,802,664
[45] Apr. 9, 1974

[54] APPARATUS FOR ATTACHING A BUMPER JACK TO A TRAILER FRAME

[76] Inventor: Gilbert D. Edwards, Rt. 4, Box 222, Decatur, Ala. 35601

[22] Filed: Jan. 5, 1973

[21] Appl. No.: 321,230

[52] U.S. Cl. ............................................. 254/134
[51] Int. Cl. ................................................ B66f 13/00
[58] Field of Search............ 254/134, 133, 45, 86 R, 254/86 H

[56] References Cited
UNITED STATES PATENTS

| | | | |
|---|---|---|---|
| 3,753,550 | 8/1973 | Criswell | 254/133 |
| 3,580,543 | 5/1971 | Hafeli | 254/86 R |
| 3,332,661 | 7/1967 | Hand | 254/86 H |

*Primary Examiner*—Al Lawrence Smith
*Assistant Examiner*—Robert C. Watson
*Attorney, Agent, or Firm*—Jennings, Carter & Thompson

[57] ABSTRACT

A tubular support is secured to a trailer frame with at least one end extending laterally from said frame. An elongated member telescopes within the tubular support and carries an upstanding plate outwardly of the tubular support. Retaining means holds said elongated member at selected longitudinal positions relative to the tubular support to position the plate at selected lateral positions. Also, the upstanding plate is supported at selected positions at right angles to each other.

5 Claims, 3 Drawing Figures

APPARATUS FOR ATTACHING A BUMPER JACK TO A TRAILER FRAME

BACKGROUND OF THE INVENTION

This invention relates to apparatus for attaching a bumper jack to a trailer frame and more particularly to such apparatus which is carried by the trailer frame and is adapted for use with conventional type bumper jacks.

Heretofore in the art to which my invention relates, difficulties have been encountered in lifting or jacking trailers, such as boat trailers, house trailers, utility trailers and the like due to the fact that it is necessary to position a jack beneath the axle portion of the trailer and then lift the trailer from this point. This not only requires a person to move beneath the trailer for installing the jack but also necessitates the use of a jack other than the conventional type bumper jack carried by automobiles. Accordingly, it is necessary to carry a conventional type bumper jack for lifting the automobile and a different type jack for lifting the trailer, whereby storage area is required for the additional jack.

To attempt to lift a trailer with a conventional type bumper jack is very dangerous due to the fact that no stable attaching means is provided for attaching the trailer frame to the jack. Accordingly, the bumper jack tends to slip relative to the trailer, thus endangering the operator of the jack and also causing damage to the trailer and the bumper jack employed.

BRIEF SUMMARY OF THE INVENTION

In accordance with by invention, I provide apparatus for attaching a bumper jack to a trailer frame which is carried by the trailer frame at all times whereby a conventional type bumper jack may be readily attached to the vehicle frame without danger to the operator and without damage to the trailer. A tubular support member is secured to the trailer frame with at least one end extending laterally from the trailer frame. An elongated member telescopically engages the tubular support and carries an upstanding plate outwardly of the tubular support. Retaining means is employed to hold the elongated member at selected positions relative to the tubular supports whereby the plate is supported at selected lateral positions. Also, the upstanding plate is supported at selected positions at right angles to each other whereby it may be moved selectively to an operative position and an inoperative position.

DESCRIPTION OF THE DRAWINGS

Apparatus embodying features of my invention is illustrated in the accompanying drawing, forming a part of this application, in which.

Figure 1:
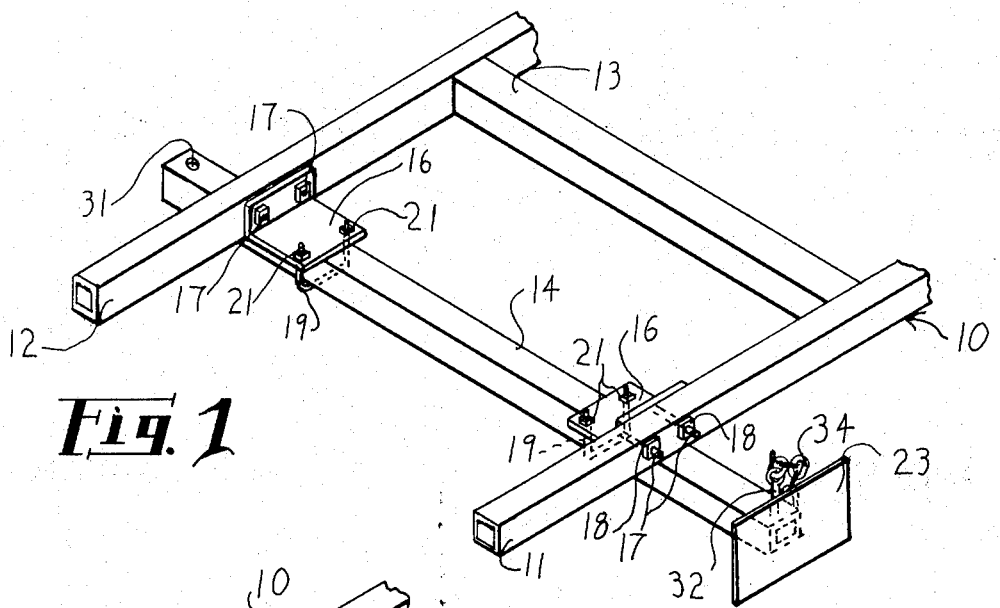
FIG. 1 is a fragmental, perspective view showing my improved apparatus attached to a trailer frame with the plate-like, bumper jack engaging member being shown in the inoperative position.

Referring now to the drawing for a better understanding of my invention, I show a trailer frame generally at 10 which may comprise the usual side frame members 11 and 12 and the usual transverse frame members, one of which is indicated at 13. In view of the fact that the trailer frame may assume various shapes and sizes no further description thereof is deemed necessary.

Extending transversely of the trailer frame 10 and secured rigidly to the side members 11 and 12 is an elongated tubular support member 14 which is preferably square, as viewed in cross section. The tubular support member 14 may be secured to the frame 10 by angle brackets 16, as shown in FIG. 1. The angle brackets 16 are secured to the elongated side members 11 and 12 by bolts 17 which pass through suitable openings provided in the brackets 16 and the side members 11 and 12. Retaining nuts 18 secure the bolt 17 in place. The angle brackets 16 are secured to the elongated tubular support member 14 by U-bolts 19. The legs of the U-bolt 19 extend upwardly through suitable openings in the horizontal flange of the angle bracket 16 and are secured to place by retaining nuts 21. Preferably, the elongated tubular support member 14 extends from one side of the trailer frame 10 to the other with opposite ends thereof projecting laterally from opposite sides of the trailer frame, as shown in FIG. 1.

Figure 3:
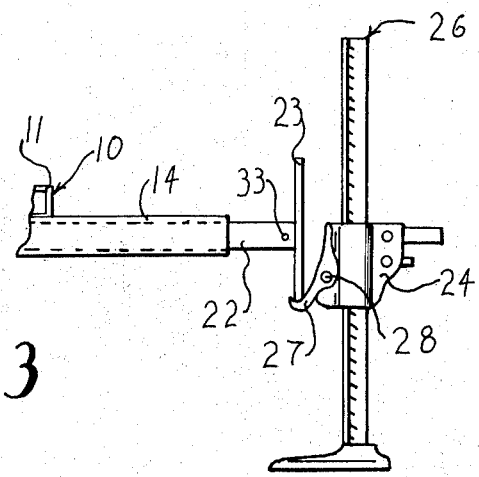

An elongated member 22 is adapted to telescope into either end of the tubular support member 14 with a sliding fit. Secured rigidly to an end of the elongated member 22 is an upstanding plate-like member 23 which is movable with the elongated member 22 to selected positions relative to the adjacent end of the elongated support member 14. The elongated member 22 is also square, as viewed in cross section, and is provided with an external surface corresponding in shape and size to the internal surface of the elongated tubular support member 14 whereby the elongated member 22 is supported firmly within either end of the elongated support member 14. The upstanding plate-like member 23 is thus adapted to be moved to a position to engage the movable element 24 of a conventional type bumper jack indicated generally at 26. The movable element 24 of the bumper jack is provided with the usual bumper engaging member 27 which is supported by a pivot pin 28, as shown in FIG. 3.

Longitudinally spaced openings 29 extend through the elongated member 22 in position to move into vertical alignment with an opening 31 provided adjacent each end of the elongated support member 14. A lock pin 32 extends through the opening 31 and a selected one of the openings 29 to hold the upstanding plate-like member 23 at selected lateral positions relative to the adjacent end of the elongated support member 14. In order for the upstanding plate-like member 23 to assume a minimum of vertical space while in the inoperative position, as shown in FIG. 1, the plate-like member 23 is rectangular in shape whereby the longer dimension extends in a horizontal plane while in the inoperative position. To lock the plate-like member 23 in the inoperative position, an opening 33 is provided in the side of the elongated member 22 and extends at right angles to the openings 29 whereby the lock pin 32 passes through the opening 31 and the opening 33 to lock the plate-like member 23 in the inoperative position shown in FIG. 1.

From the foregoing description, the operation of my apparatus for attaching a bumper jack to a trailer frame will be readily understood. While not in use, the upstanding plate-like member 23 is rotated to the position shown in FIG. 1 whereby the long dimension thereof extends in a horizontal plane. The elongated member 22 is then inserted in the adjacent end of the elongated support member 14 and the lock pin 32 is inserted through the opening 31 and the opening 29 adjacent the upstanding plate-like member 23 whereby the plate-like member 23 is secured in its innermost position relative to the adjacent end of the member 14.

Figure 2:
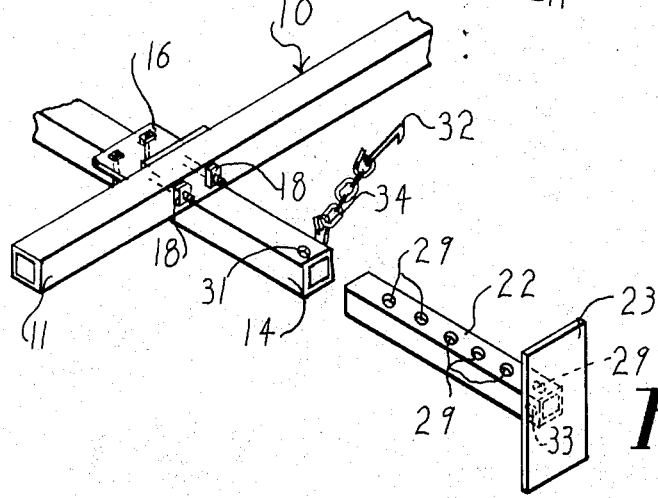
FIG. 2 is a fragmental view showing only one side of the trailer frame with the elongated member carrying the upstanding plate-like member removed from the elongated tubular member and with the plate-like member extending in its operative position; and, FIG. 3 is a side elevational view showing the manner in which one side of the trailer frame is supported by a bumper jack.

To lift one side of the trailer frame 10, the pin 32 is removed and the elongated member 22 is then moved outwardly of the tubular support member 14 and is rotated ninety degrees to the position shown in FIG. 2. The upstanding plate-like member 23 is then moved inwardly to the proper position to engage the movable element 24 of the bumper jack 26. The lock pin 32 is then inserted through the opening 31 and a selected one of the openings 29 whereby the plate 23 is secured firmly in place as the bumper jack 26 is operated in the usual manner.

To lift the opposite side of the trailer frame 10, the elongated member 22 is removed from the adjacent end of the elongated support member 14 and is then inserted in the opposite end thereof and the lock pin 32 is inserted through the opening 31 and a selected one of the openings 29 to thus support the upstanding plate-like member 23 in position to engage the member 27 of the movable element 24 of the jack 26. The lock pin 32 may be carried by a flexible chain 34, as shown in FIGS. 1 and 2 to prevent loss of the lock pin. When the lock pin 32 is to be inserted in the opening 31 at the opposite end of the tubular support member 14 from the end thereof carrying the chain 34, the lock pin 32 is removed from the chain 34 and inserted in the opening 31 at the opposite end of the support member 14. If desired, a separate chain 34 and lock pin 32 may be attached to opposite ends of the support member 14.

When it is desired to store the elongated member 22 and the upstanding member 23 carried thereby, the elongated member 22 is removed from the tubular support member 14 and is rotated 90° as described above whereby the longer dimension of the plate 23 extends in a horizontal plane, as shown in FIG. 1. The elongated member 22 is moved inwardly until the plate 23 engages the adjacent end of the elongated support member 14. The lock pin 32 is then inserted through the adjacent opening 31 and the outermost opening 29 is provided in the elongated member 22 to thus secure the upstanding plate-like member 23 in place.

From the foregoing, it will be seen that I have devised improved apparatus for attaching a bumper jack to a trailer frame. By providing a bumper jack engaging assembly which is carried by the trailer frame no additional storage space is required in the automobile and at the same time the usual bumper jack carried by the automobile may be employed to lift the trailer. Also, by providing the elongated member 22 carrying the plate 23 which is adapted for movement to selected lateral positions relative to the trailer frame 10, the plate-like member 23 is easily moved to proper position to engage the member 27 of the movable element 24 of the bumper jack 26. Furthermore, by providing a firm, sliding fit between the elongated member 22 and the inner surface of the elongated support member 14, the plate-like member 23 is supported in a sturdy manner, thus preventing injury to the operator or damage to the trailer.

While I have shown my invention in but one form, it will be obvious to those skilled in the art that it is not so limited, but is susceptible of various other changes and modifications without departing from the spirit thereof.

What I claim is:

1. In apparatus for attaching the movable element of a vehicle bumper jack to a trailer frame comprising:
   a. an elongated tubular support member secured to said trailer frame with at least one end of said tubular support member extending laterally from said frame,
   b. an elongated member telescoping into said tubular support member with a sliding fit, said elongated member having means for engaging a vehicle bumper jack,
   c. said engaging means including an upstanding plate-like member carried by an end of said elongated member outwardly of said tubular support member, and
   d. means retaining said elongated member at selected longitudinal positions relative to said tubular support member to position said plate-like member at selected lateral positions relative to said trailer frame and in position to engage the movable element of a bumper jack.

2. Apparatus for attaching a bumper jack to a trailer frame as defined in claim 1 in which said elongated member has an external surface corresponding in shape and size to the internal surface of said tubular support member.

3. Apparatus for attaching a bumper jack to a trailer frame as defined in claim 1 in which said elongated tubular support member extends transversely of said trailer frame with opposite ends thereof projecting laterally from opposite sides of said trailer frame.

4. Apparatus for attaching a bumper jack to a trailer frame as defined in claim 1 in which said tubular support member and said elongated member are both square, as viewed in cross section and said plate-like member is rectangular with its longer dimension extending in a horizontal plane while in an inoperative position, so that said upstanding plate-like member is supported selectively in planes which are at right angles to each other whereby said upstanding plate-like member is movable selectively to an operating position and an inoperable position.

5. Apparatus for attaching a bumper jack to a trailer frame as defined in claim 1 in which said means retaining said elongated member at selected longitudinal positions relative to said tubular support member comprises:
   a. at least one transverse opening through one of said elongated members and a plurality of longitudinally spaced transverse openings through the other of said elongated members, and
   b. a retaining pin disposed to pass through said one transverse opening and a selected one of said openings through said other elongated member.

* * * * *